(12) United States Patent
Omori et al.

(10) Patent No.: US 10,155,365 B2
(45) Date of Patent: Dec. 18, 2018

(54) GAS BARRIER PACKAGING MATERIAL

(71) Applicant: TOPPAN PRINTING CO., LTD., Tokyo (JP)

(72) Inventors: Haruka Omori, Tokyo (JP); Noboru Omori, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 26 days.

(21) Appl. No.: 15/349,622

(22) Filed: Nov. 11, 2016

(65) Prior Publication Data
US 2017/0057209 A1 Mar. 2, 2017

Related U.S. Application Data

(63) Continuation of application No. PCT/JP2015/063895, filed on May 14, 2015.

(30) Foreign Application Priority Data

May 15, 2014 (JP) ................... 2014-101434

(51) Int. Cl.
*B32B 27/08* (2006.01)
*B32B 27/32* (2006.01)
(Continued)

(52) U.S. Cl.
CPC ............... *B32B 27/08* (2013.01); *B32B 7/12* (2013.01); *B32B 27/00* (2013.01); *B32B 27/30* (2013.01);
(Continued)

(58) Field of Classification Search
CPC .......... B32B 2250/02; B32B 2250/242; B32B 2255/10; B32B 2255/26;
(Continued)

(56) References Cited

U.S. PATENT DOCUMENTS

| | | | | |
|---|---|---|---|---|
| 8,124,236 | B2 * | 2/2012 | Okawara | B32B 27/00 428/425.5 |
| 2001/0016260 | A1 * | 8/2001 | Yoshida | C08G 18/0823 428/425.8 |
| 2002/0143098 | A1 * | 10/2002 | Kawai | B29C 47/0004 524/503 |
| 2007/0134507 | A1 | 6/2007 | Yamasaki et al. | |
| 2010/0136350 | A1 * | 6/2010 | Inaba | B32B 7/12 428/447 |

(Continued)

FOREIGN PATENT DOCUMENTS

| | | |
|---|---|---|
| CN | 1942549 A | 4/2007 |
| EP | 2 351 803 | 8/2011 |

(Continued)

OTHER PUBLICATIONS

International Search Report issued in International Patent Application No. PCT/JP2015/063895 dated Aug. 18, 2015.

(Continued)

*Primary Examiner* — Thao T Tran
(74) *Attorney, Agent, or Firm* — Foley & Lardner LLP (57) ABSTRACT

A gas barrier packaging material includes: a support; and a gas barrier layer made up of an adhesive layer (A) which is disposed on one surface of the support and contains an aqueous polyurethane resin (a1), a water soluble polymer (a2) and a curing agent (a3) with a formulation ratio of the aqueous polyurethane resin (a1) and the water soluble polymer (a2) in the range from 10:90 to 60:40 in mass ratio, and a barrier layer (B) which is formed on the adhesive layer (A).

2 Claims, 1 Drawing Sheet (51) Int. Cl.
  *B32B 7/12* (2006.01)
  *B65D 65/40* (2006.01)
  *B65D 81/24* (2006.01)
  *B32B 27/00* (2006.01)
  *B32B 27/30* (2006.01)
  *B32B 27/40* (2006.01)
  *C08J 7/04* (2006.01)

(52) U.S. Cl.
  CPC .......... *B32B 27/306* (2013.01); *B32B 27/308* (2013.01); *B32B 27/32* (2013.01); *B32B 27/40* (2013.01); *B65D 65/40* (2013.01); *B65D 81/24* (2013.01); *C08J 7/042* (2013.01); *B32B 2250/02* (2013.01); *B32B 2250/242* (2013.01); *B32B 2255/10* (2013.01); *B32B 2255/26* (2013.01); *B32B 2307/7242* (2013.01); *B32B 2553/00* (2013.01)

(58) Field of Classification Search
  CPC ........ B32B 2307/7242; B32B 2253/00; B32B 17/00; B32B 17/08; B32B 17/30; B32B 17/306; B32B 17/308; B32B 17/32; B32B 17/40; B32B 7/12; B65D 65/40; B65D 81/24; C08J 7/042
  USPC .............................................. 428/424.2, 515
  See application file for complete search history.

(56) References Cited

U.S. PATENT DOCUMENTS

| | | | |
|---|---|---|---|
| 2017/0036832 A1* | 2/2017 | Omura | B32B 9/00 |
| 2017/0210909 A1* | 7/2017 | Kidokoro | C09D 4/06 |

FOREIGN PATENT DOCUMENTS

| | | |
|---|---|---|
| EP | 3 135 478 | 3/2017 |
| JP | 2005-126539 A | 5/2005 |
| JP | 2007-313758 | 12/2007 |
| JP | 2009-006707 A | 1/2009 |
| JP | 2009-167364 A | 7/2009 |
| JP | 4373797 B2 | 11/2009 |
| JP | 4765090 B2 | 9/2011 |
| JP | 5012895 B2 | 8/2012 |
| WO | WO-2014/192500 A1 | 12/2014 |

OTHER PUBLICATIONS

Extended European Search Report issued in EP Patent Application No. 15793093.4 dated Nov. 20, 2017.
Chinese Office Action dated Jan. 10, 2018 in corresponding application No. 2015800259875.
Chinese Office Action dated Sep. 7, 2018 in corresponding application No. 2015800259875.

* cited by examiner

GAS BARRIER PACKAGING MATERIAL

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2015/063895 filed on May 14, 2015, which is based upon and claims the benefit of priority of Japanese Patent Application No. 2014-101434, filed on May 15, 2014, the entire contents of which are all hereby incorporated by reference.

TECHNICAL FIELD

The present invention relates to gas barrier packaging materials.

BACKGROUND

Packaging materials used for food products or pharmaceutical products are required to protect the product inside from being degraded. For example, packaging materials for food products are required to reduce oxidation or degradation of protein, oil and fat or the like and thereby to preserve flavor and freshness. Further, packaging materials for pharmaceutical products that should be handled under aseptic conditions are required to protect the active ingredients of the product from being degraded in order to preserve the efficacy of the ingredients.

Such degradation of the products is mainly caused by oxygen or moisture that penetrates through the packaging material or other gases that are reactive to the product. Accordingly, packaging materials used for food products or pharmaceutical products are required to have properties that do not allow gases such as oxygen and moisture to penetrate therethrough (gas barrier properties).

In order to meet such requirements, gas barrier films formed of a polymer having relatively high gas barrier properties (gas barrier polymer) or a laminate (laminate film) which uses the gas barrier film as a substrate film have been used.

Conventionally, polymers containing a highly hydrophilic hydrogen bonding group in a molecule, which is represented by poly(meth)acrylic acid or polyvinyl alcohol, have been used as gas barrier polymers. Packaging materials made of such polymers exhibits good gas barrier properties to oxygen or the like under dry conditions. However, packaging materials made of such polymers have a problem in that gas barrier properties to oxygen or the like are significantly impaired due to hydrophilicity under a condition of high humidity and that resistance to humidity or hot water is poor.

In order to solve these problems, it is known to obtain a gas barrier packaging material by laminating a polycarboxylic acid polymer layer and a polyvalent metal compound-containing layer in an adjacent manner on a substrate so that polycarboxylic acid polymer reacts with a polyvalent metal compound between two layers of the polycarboxylic acid polymer layer and the polyvalent metal compound-containing layer to generate a polyvalent metal salt of the polycarboxylic acid polymer (for example, see PTLs 1 and 2). The gas barrier packaging material thus obtained is known to have high oxygen gas barrier properties under a condition of high humidity.

CITATION LIST

Patent Literature

PTL 1 JP-B-4373797
PTL 2 JP-B-5012895
PTL 3 JP-B-4765090

SUMMARY OF THE INVENTION

Technical Problem

However, in the gas barrier packaging material described in PTL 1 and PTL 2, it is necessary to form polyvalent metal salt of the polycarboxylic acid polymer by reacting the polycarboxylic acid polymer with the polyvalent metal compound in order to express gas barrier properties. Accordingly, the gas barrier packaging material needs to be retort-treated or exposed to a highly humid environment for an extended period of time. As a consequence, there is a problem that, if used for an application that does not require retort treatment, the gas barrier packaging material cannot achieve the required gas barrier properties.

In order to solve the problem, there is a known gas barrier packaging material that does not need retort treatment or the like (for example, see PTL 3). In the gas barrier packaging material described in PTL 3, a gas barrier layer is laminated on an inorganic layer so that gas barrier properties can be exhibited without applying retort treatment. However, when the gas barrier layer is formed directly on a support made of a plastic film, the support should be limited to a polyethylene terephthalate (PET) film or the like. In addition, there is a problem that the gas barrier packaging material cannot be manufactured by a general coating apparatus since a vapor deposition apparatus is necessary to form the inorganic layer. The present invention has been provided in light of the above circumstances, and has an object of providing a gas barrier packaging material which can be manufactured by using only a general coating apparatus without applying a high temperature and high pressure treatment such as retort treatment.

Proposed Improvement or Solution to Problem

A gas barrier packaging material according to an aspect of the present invention includes a support, and a gas barrier layer made up of an adhesive layer (A) which is disposed on one surface of the support and contains an aqueous polyurethane resin (a1), a water soluble polymer (a2) and a curing agent (a3) with a formulation ratio of the aqueous polyurethane resin (a1) and the water soluble polymer (a2) in the range from 10:90 to 60:40 in mass ratio, and a barrier layer (B) which is formed on the adhesive layer (A).

The water soluble polymer (a2) may be at least one of a polyvinyl alcohol polymer and derivatives thereof.

The barrier layer (B) may contain at least polyvalent metal salt of a polycarboxylic acid polymer (b1), and, when an infrared absorption spectrum of the barrier layer (B) is measured by a transmission method, a ratio ($\alpha/\beta$), which is a ratio of a maximum peak height ($\alpha$) of absorbance in the range from 1490 $cm^{-1}$ to 1659 $cm^{-1}$ to a maximum peak height ($\beta$) of absorbance in the range from 1660 $cm^{-1}$ to 1750 $cm^{-1}$, may be 1 or more.

The support may contain polyolefin.

Advantageous Effects of Invention

According to an aspect of the present invention, a gas barrier packaging material which can be manufactured by using only a general coating apparatus without applying a high temperature and high pressure treatment such as a retort treatment can be provided.

DESCRIPTION OF REPRESENTATIVE EMBODIMENTS

A gas barrier packaging material according to an embodiment of the present invention will be described.

This embodiment is specifically described for better understanding of the principle of the invention, and should not be construed to limit the present invention unless otherwise specified.

[Gas Barrier Packaging Material 1]

Figure 1:
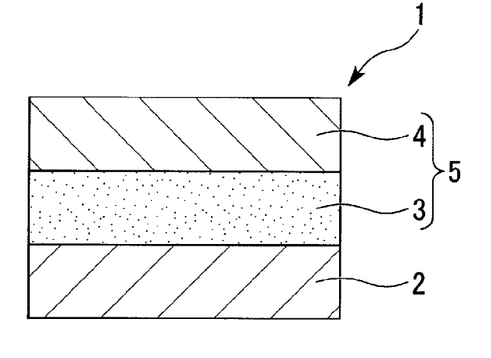
FIG. 1 is a cross sectional view of an example of a gas barrier packaging material according to an embodiment of the present invention.

A gas barrier packaging material 1 according to one embodiment of the present invention includes a support 2, and a gas barrier layer 5 made up of an adhesive layer (A)3 which is disposed on one surface of the support 2 and contains an aqueous polyurethane resin (a1), a water soluble polymer (a2) and a curing agent (a3) with a formulation ratio of the aqueous polyurethane resin (a1) and the water soluble polymer (a2) in the range from 10:90 to 60:40 in mass ratio, and a barrier layer (B)4 which is formed on the adhesive layer (A)3.

In the gas barrier packaging material 1 according to the present embodiment, the adhesive layer (A)3 and the barrier layer (B)4 are laminated in this order (in sequence) on one surface of the support such that the adhesive layer (A)3 and the barrier layer (B)4 form the gas barrier layer 5.

[Support 2]

The support 2 is in the form of, but is not specifically limited to, film, sheet, bottle, cup, tray, tank, tube or the like. In this embodiment, a film or sheet is preferable considering laminating a barrier layer or the like.

The thickness of the support 2 is preferably in the range from 5 µm to 5 mm, although it varies depending on the application.

For the application of film or sheet, the thickness of the support 2 is preferably in the range from 5 µm to 800 µm, more preferably in the range from 5 µm to 500 µm.

When the thickness of the support 2 is within the above range, high processability and productivity in each application can be achieved.

Examples of materials for the support 2 include plastics, paper, rubber and the like. Among these materials, plastics are preferable considering adhesiveness between the support 2 and the adhesive layer (A)3.

Materials for plastics include, for example, polyolefin-based polymers such as low density polyethylene, high density polyethylene, linear low density polyethylene, polypropylene, poly 4-methylpentene and cyclic polyolefin, copolymers of those polyolefin-based polymers, and acid-modified products of those polyolefin-based polymers; vinyl acetate-based copolymers such as polyvinyl acetate, ethylene-vinyl acetate copolymer, saponified ethylene-vinyl acetate copolymer and polyvinyl alcohol; polyester-based polymers such as polyethylene terephthalate, polybutylene terephthalate, polyethylene naphthalate, poly ε-caprolactone, polyhydroxybutyrate and polyhydroxyvalerate, and copolymers of those polyester-based polymers; polyamide-based polymers such as nylon 6, nylon 66, nylon 12, nylon 6-nylon 66 copolymer, nylon 6-nylon 12 copolymer, metaxylene adipamide/nylon 6 copolymer, copolymers of those amide-based polymers; polyether-based polymers such as polyethylene glycol, polyether sulfone, polyphenylene sulfide and polyphenylene oxide; chloride-based polymers or fluoride-based polymers such as polyvinyl chloride, polyvinylidene chloride, polyvinyl fluoride and polyvinylidene fluoride, copolymers of those chloride-based polymers or copolymers of those fluoride-based polymers; acryl-based polymers such as polymethylacrylate, polyethylacrylate, polymethylmethacrylate, polyethylmethacrylate and polyacrylonitrile, and copolymers of those acryl-based polymers; polyimide-based polymers, and copolymers of those polyimide-based polymers; resins such as alkyd resin, melamine resin, acryl resin, nitrocellulose, urethane resin, unsaturated polyester resin, phenolic resin, amino resin, fluoride resin and epoxy resin for painting; and natural polymer compounds such as cellulose, starch, pullulan, chitin, chitosan, glucomannan, agarose and gelatin, and mixtures of those natural polymer compounds.

Further, the support 2 may be processed with a surface activation treatment such as corona treatment, flame treatment or plasma treatment in view of adhesiveness between the support 2 and the adhesive layer (A)3.

[Adhesive Layer (A)3]

The adhesive layer (A)3 is formed of a coating liquid A which contains the aqueous polyurethane resin (a1), the water soluble polymer (a2) and the curing agent (a3). The adhesive layer is preferably formed by applying and drying the coating liquid A on one surface of the support 2.

The thickness of the adhesive layer (A)3 is not specifically limited as long as a uniform coat layer can be formed, but is preferably in the range from 0.01 µm to 2 µm, more preferably in the range from 0.05 µm to 1 µm.

When the thickness of the adhesive layer (A)3 is 0.01 µm or more, a uniform coat layer can be easily formed, which is advantageous in view of adhesiveness to the support 2. Further, when the thickness of the adhesive layer (A)3 is 2 µm or less, a coat layer can have softness (flexibility), thereby reducing a risk of cracking due to external factors.

When the thickness of the adhesive layer (A)3 is 0.05 µm or more, a uniform coat layer can be more easily formed, which is advantageous in view of adhesiveness to the support 2. Further, when the thickness of the adhesive layer (A)3 is 1 µm or less, a coat layer is imparted with higher softness (flexibility), thereby preventing the risk of cracking due to external factors.

<Aqueous Polyurethane Resin (a1)>

Due to containing the aqueous polyurethane resin (a1) having water solubility or water dispersibility, the adhesive layer (A)3 exhibits wettability and adhesiveness to the support 2.

The acid group of the polyurethane resin (anionic self-emulsified polyurethane resin) which constitutes the aqueous polyurethane resin (a1) includes a carboxyl group, a sulfonic acid group and the like. Although the acid group may be located at a terminal or a side chain of the polyurethane resin, the acid group should be located at least at a side chain of the polyurethane resin. This acid group can be usually neutralized with a neutralizer (base) and may form a salt and a base.

Further, the acid group can be bonded with an amino group (an imino group or a tertiary nitrogen atom) of the polyamine compound that constitutes the aqueous polyurethane resin (a1).

The acid value of the polyurethane resin can be selected within a range capable of imparting water solubility or water dispersibility and is generally in the range from 5 to 100 mg KOH/g, preferably in the range from 10 to 70 mg KOH/g, and more preferably in the range from 15 to 60 mg KOH/g.

The polyurethane resin generally contains at least rigid units (units constituted of a hydrocarbon ring) and short-chain units (e.g., units constituted of a hydrocarbon chain). That is, the recurring units of the polyurethane resin generally contain a hydrocarbon ring (at least one of aromatic and non-aromatic hydrocarbon rings) derived from a polyisocyanate component, a polyhydroxy acid component, a polyol component or a chain elongation component (especially, at least a polyisocyanate component).

The ratio of the hydrocarbon ring units to the recurring units of the polyurethane resin is generally in the range from 10 to 70 mass %, preferably in the range from 15 to 65 mass %, and more preferably in the range from 20 to 60 mass %.

When the ratio of the hydrocarbon ring units to the recurring units of the polyurethane resin is within the above range, the coating liquid A has a viscosity which is not unduly high, a good coating applicability and a good coating liquid stability.

The number-average molecular weight of the polyurethane resin may be appropriately selected and is preferably in the range from 800 to 1,000,000, more preferably in the range from 800 to 200,000 and further more preferably in the range from 800 to 100,000.

When the number-average molecular weight of the polyurethane resin is within the above range, the coating liquid A has a viscosity which is not unduly high, a good coating applicability and a good coating liquid stability.

Further, the number-average molecular weight of the polyurethane resin is a polystyrene-converted number-average molecular weight obtained by gel permeation chromatography (GPC).

The aqueous polyurethane resin (a1) generally contains a neutralizer and is formed with the above polyurethane resin being dissolved or dispersed in an aqueous medium.

The aqueous medium includes water, a water soluble solvent, a hydrophilic solvent or a combination thereof. The aqueous medium is generally water or an aqueous solvent which contains water as a main component.

Examples of the hydrophilic solvent includes alcohols such as ethanol, isopropanol and the like, ketones such as acetone, methyl ethyl ketone and the like; ethers such as tetrahydrofuran; cellosolves; carbitols; and nitriles such as acetonitrile.

The aqueous polyurethane resin (a1) may be either an aqueous solution of the polyurethane resin dissolved in an aqueous medium or an aqueous dispersion of the polyurethane resin dispersed in an aqueous medium.

In the aqueous dispersion, the average particle size of dispersed particles (polyurethane resin particles) is not specifically limited and is, for example, in the range from 20 nm to 500 nm, preferably in the range from 25 nm to 300 nm, and more preferably in the range from 30 nm to 200 nm.

When the average particle size of dispersed particles (polyurethane resin particles) in the aqueous dispersion is within the above range, the coating liquid A has a viscosity which is not unduly high, a good coating applicability and a good coating liquid stability.

Methods for manufacturing the aqueous polyurethane resin (a1) are not specifically limited, and may be ordinary aqueous conversion techniques of polyurethane resin such as an acetone method, a prepolymer method and the like.

Further, in urethanation reactions, urethanation catalysts such as an amine catalyst, a tin catalyst and a lead catalyst may be used as necessary.

Examples of methods for manufacturing the aqueous polyurethane resin (a1) include reacting a polyisocyanate compound, a polyhydroxy acid and, if necessary, at least one of a polyol component and a chain extension component in an inert organic solvent including ketones such as acetone, ethers such as tetrahydrofuran and nitriles such as acetonitrile.

More specifically, a polyisocyanate compound, a polyhydroxy acid and a polyol component are reacted in an inert organic solvent (particularly, a hydrophilic or water-soluble organic solvent) to generate a prepolymer having an isocyanate group at terminals thereof. The generated prepolymer is neutralized by using a neutralizer for dissolution or dispersion in an aqueous medium. After that, a chain extension component is added thereto for reaction and the organic solvent is removed, thereby preparing the aqueous polyurethane resin (a1).

The formulation ratio ((a1):(a2)) of the aqueous polyurethane resin (a1) and the water soluble polymer (a2), which will be described later, is in the range from 10:90 to 60:40, most preferably in the range from 10:90 to 50:50 in mass ratio.

When the formulation ratio of the aqueous polyurethane resin (a1) and the water soluble polymer (a2) is less than 10:90 (when the formulation ratio of the aqueous polyurethane resin (a1) to the aqueous polyurethane resin (a1) and water soluble polymer (a2) is less than 10% in mass ratio), the adhesiveness to the support 2 derived from the aqueous polyurethane resin (a1) decreases. On the other hand, when the formulation ratio of the aqueous polyurethane resin (a1) and the water soluble polymer (a2) is more than 60:40 (when the formulation ratio of the aqueous polyurethane resin (a1) to the aqueous polyurethane resin (a1) and water soluble polymer (a2) is more than 60% in mass ratio), affinity between the adhesive layer (A)3 and the barrier layer (B)4 laminated on the adhesive layer (A)3 decreases, leading to repelling of aqueous solution. Accordingly, the barrier layer (B)4 cannot be formed on the adhesive layer (A)3.

When the ratio of the aqueous polyurethane resin (a1) to the aqueous polyurethane resin (a1) and the water soluble polymer (a2) is in the range from 10 to 50%, good adhesiveness between the support 2 and the adhesive layer (A)3 and good adhesiveness between the barrier layer (B)4 and the adhesive layer (A)3 can be achieved.

<Water Soluble Polymer (a2)>

The water soluble polymer (a2) is a polymer that can be completely dissolved or finely dispersed in water at a normal temperature. Examples of the water soluble polymer (a2) include polyvinyl alcohol polymer and its derivatives; cellulose derivatives such as carboxymethylcellulose and hydroxyethylcellulose; starches such as oxidized starch, etherified starch and dextrin; polyvinylpyrrolidone, polyacrylic acid, polymethacrylic acid or their ethers and salts, and copolymers thereof; copolymerized polyesters containing a polar group such as of sulfoisophthalic acid; vinyl polymers such as polyhydroxyethyl methacrylate and copolymers thereof; urethane polymer; or functional group modified polymers such as carboxyl group modified polymers of the above described various polymers.

Of these polymers, at least one of a polyvinyl alcohol polymer and derivatives thereof is preferable in view of adhesiveness between the adhesive layer (A)3 and the barrier layer (B)4 laminated on the adhesive layer (A)3.

The degree of saponification of the polyvinyl alcohol polymer and the derivative used in the present embodiment is preferably 65 mol % or more. When the degree of saponification is less than 65 mol %, the polyvinyl alcohol polymer and the derivative may not dissolve in water and not be mixed with the aqueous polyurethane resin (a1).

Although the polyvinyl alcohol polymer and the derivative generally have a degree of polymerization approximately in the range from 100 to 10000, the polyvinyl alcohol polymer and the derivative having a degree of polymerization less than 100 can also be applied to the gas barrier packaging material 1 according to the present embodiment.

The polyvinyl alcohol polymer and the derivative used in the present embodiment is not specifically limited as long as they are water soluble. However, the degree of polymerization is preferably 3500 or less since the viscosity increases with increase in the degree of polymerization.

<Curing Agent (a3)>

The curing agent (a3) may be any compound which is reactive to at least one of the aqueous polyurethane resin (a1) and the water soluble polymer (a2).

Particularly, the curing agent (a3) is preferably made of a water dispersible (water soluble) carbodiimide, a water soluble epoxy compound, a water dispersible (water soluble) oxazolidone compound, a water soluble aziridine compound, a water dispersible polyisocyanate curing agent or the like. Specifically, a water dispersible polyisocyanate curing agent, which is highly reactive to acid group of a water soluble urethane resin which constitutes the aqueous polyurethane resin (a1), is preferably used.

Examples of polyisocyanate compounds used for the water dispersible polyisocyanate curing agent include aromatic polyisocyanate, alicyclic polyisocyanate and aliphatic polyisocyanate. In order to suppress reactions in the aqueous coating agent and extend a usable period of time, alicyclic polyisocyanate and aliphatic polyisocyanate are preferably used.

Examples of polyisocyanate compounds constituting alicyclic polyisocyanate include bis(isocyanate) methylcyclohexane (hydrogenated XDI), and methylene bis(4,1-cyclohexylene)=diisocyanate (hydrogenated MDI).

Examples of polyisocyanate compounds constituting aliphatic polyisocyanate include trimethylene diisocyanate, 1,2-propylene diisocyanate, butylene diisocyanate, tetramethylene diisocyanate, hexamethylene diisocyanate and pentamethylene diisocyanate.

Aromatic polyisocyanate, alicyclic polyisocyanate and aliphatic polyisocyanate can be used as a mixture.

The content of the curing agent (a3) to the total solid content of the coating liquid A that constitutes the adhesive layer (A)3 is preferably in the range from 5 mass % to 15 mass %.

When the content of the curing agent (a3) is less than 5 mass %, the adhesiveness of the adhesive layer (A)3 to the support 2 decreases. On the other hand, when the content of the curing agent (a3) is more than 15 mass %, the adhesiveness between the adhesive layer (A)3 and the barrier layer (B)4 laminated on the adhesive layer (A)3 decreases.

<Coating Liquid A of Adhesive Layer (A)3>

The adhesive layer (A)3 is formed of the coating liquid A.

The coating liquid A contains a composite of the aqueous polyurethane resin (a1), the water soluble polymer (a2) and the curing agent (a3).

Examples of the solvent used for the coating liquid A include, but are not specifically limited to, water, an organic solvent such as methyl alcohol, ethylalcohol, isopropyl alcohol, n-propyl alcohol, n-butyl alcohol, n-pentyl alcohol, dimethyl sulfoxide, dimethylformamide, dimethylacetamide, toluene, hexane, heptane, cyclohexane, acetone, methyl ethyl ketone, diethylether, dioxane, tetrahydrofuran, ethyl acetate and butyl acetate.

Further, the solid content concentration of the coating liquid A is preferably in the range from 0.5 mass % to 50 mass % relative to 100 mass % of the coating liquid A in view of the coating applicability.

[Barrier Layer (B)4]

The barrier layer (B)4 preferably contains at least polyvalent metal salt of the polycarboxylic acid polymer (b1).

When an infrared absorption spectrum of the barrier layer (B)4 is measured by a transmission method, the ratio ($\alpha/\beta$), which is a ratio of the maximum peak height ($\alpha$) of absorbance in the range from 1490 $cm^{-1}$ to 1659 $cm^{-1}$ (particularly, 1560 $cm^{-1}$) to the maximum peak height ($\beta$) of absorbance in the range from 1660 $cm^{-1}$ to 1750 $cm^{-1}$ (particularly, 1700 $cm^{-1}$), is 1 or more.

The barrier layer (B)4 is formed of a coating liquid B which contains at least a polyvalent metal salt of the polycarboxylic acid polymer (b1).

The barrier layer (B)4 is preferably formed by applying and drying the coating liquid B on the adhesive layer (A)3.

Examples of the coating liquid B include a solution of a mixture which contains the polycarboxylic acid polymer (b1), a polyvalent metal compound (b2) and one of a volatile base (b3) and an acid (b4), and a solvent.

The coating liquid B is applied and dried on the adhesive layer (A)3 to form the barrier layer (B)4. In order to stabilize the coating liquid B, a carbonic acid component-containing compound (b5) may be added to the coating liquid B.

Further, examples of the coating liquid B include dispersion liquid of a mixture which contains the polycarboxylic acid polymer (b1), the polyvalent metal compound (b2) and one of the volatile base (b3) and acid (b4), and a solvent.

The coating liquid B is applied and dried on the adhesive layer (A)3 to form the barrier layer (B)4. A disperse agent, binder resin or the like may be added to the coating liquid B.

The thickness of the barrier layer (B)4 is not specifically limited as long as a uniform coat layer can be formed, but is preferably in the range from 0.001 µm to 1 mm, more preferably in the range from 0.01 µm to 100 µm, and further more preferably in the range from 0.1 µm to 10 µm.

When the thickness of the barrier layer (B)4 is 0.001 µm or more, a uniform coat layer can be easily formed, which is advantageous in adhesiveness to the adhesive layer (A)3. Further, when the thickness of the barrier layer (B)4 is 1 mm or less, an ionic cross linkage is smoothly formed as described later, thereby obtaining sufficient oxygen gas barrier properties.

When the thickness of the barrier layer (B)4 is 0.01 µm or more, a uniform coat layer can be more easily formed, thereby promoting expression of barrier properties. When the thickness of the barrier layer (B)4 is 100 µm or less, drying requires less energy. Further, when the thickness of the barrier layer (B)4 is 100 µm or less, a coat layer is less likely to undergo cracks due to external factors.

Moreover, when the thickness of the barrier layer (B)4 is in the range from 0.1 µm to 10 µm, better barrier properties can be obtained, thereby further reducing a risk of cracking due to external factors.

<Polycarboxylic Acid Polymer (b1)>

The polycarboxylic acid polymer (b1) is a polymer containing two or more carboxyl groups in a molecule. Examples of the polycarboxylic acid polymer (b1) include polymers (copolymers) of ethylene-based unsaturated carboxylic acid; copolymers of ethylene-based unsaturated carboxylic acid and other ethylene-based unsaturated monomers; and acidic polysaccharides containing a carboxyl group in a molecule such as alginic acid, carboxymethyl cellulose and pectin.

These polycarboxylic acid polymers (b1) may be used singly or in combination of two or more.

The ethylene-based unsaturated carboxylic acid may be, for example, acrylic acid, methacrylic acid, itaconic acid, maleic acid, fumaric acid or crotonic acid.

The ethylenic unsaturated monomer that can copolymerize with the ethylenic unsaturated carboxylic acid may be, for example, saturated carboxylic acid vinyl esters such as ethylene, propylene and vinyl acetate, alkyl acrylates, alkyl methacrylates, alkyl itaconates, vinyl chloride, vinylidene chloride, styrene, acryl amide or acrylonitrile.

In view of gas barrier properties of the obtained gas barrier packaging material 1, the polycarboxylic acid polymers (b1) is preferably a polymer containing a constituent unit derived from a polymeric monomer of at least one selected from a group consisting of acrylic acid, maleic acid, methacrylic acid, itaconic acid, fumaric acid and crotonic acid, or a mixture of these polymers.

Furthermore, the polycarboxylic acid polymers (b1) is more preferably a polymer containing a constituent unit derived from a polymeric monomer of at least one selected from a group consisting of acrylic acid, maleic acid, methacrylic acid, itaconic acid, or a mixture of these polymers.

For the above polymers, homopolymers or copolymers may be used.

In the above polymers, a constituent unit derived from a polymeric monomer of at least one selected from a group consisting of acrylic acid, methacrylic acid, itaconic acid and maleic acid is preferably 80 mol % or more, more preferably 90 mol % or more (when a total constituent unit is 100 mol %).

When a constituent unit derived from a polymeric monomer of at least one selected from a group consisting of acrylic acid, methacrylic acid, itaconic acid and maleic acid is within the above range, good barrier properties can be obtained.

When other constituent units than those described above are included in the above polymers, the constituent units are, for example, ethylenic unsaturated monomer that can copolymerize with the above ethylenic unsaturated carboxylic acid.

The number-average molecular weight of the polycarboxylic acid polymer (b1) is preferably in the range from 2,000 to 10,000,000.

When the number-average molecular weight of the polycarboxylic acid polymer (b1) is 2,000 or more, the resultant gas barrier packaging material 1 has good water resistance, thereby preventing deterioration of gas barrier properties or transparency or occurrence of whitening due to moisture. Further, when the number-average molecular weight of the polycarboxylic acid polymer (b1) is 10,000,000 or less, the viscosity is not unduly high and the coatability is not likely to be reduced in forming the barrier layer (B)4 by coating.

Moreover, the number-average molecular weight of the polycarboxylic acid polymer (b1) is preferably in the range from 5,000 to 10,000,000 in view of water resistance of the obtained gas barrier packaging material 1.

Further, the number-average molecular weight of the polycarboxylic acid polymer (b1) is a polystyrene-converted number-average molecular weight obtained by gel permeation chromatography (GPC).

<Polyvalent Metal Compound (b2)>

The polyvalent metal compound (b2) is a single element of polyvalent metal atom having a metal ion with a valence of 2 or more and a compound thereof.

Specific examples of polyvalent metal include alkali earth metal such as beryllium, magnesium, calcium; transition metal such as titanium, zirconium, chromium, manganese, iron, cobalt, nickel, copper, zinc; aluminum and the like.

Specific examples of the polyvalent metal compound (b2) include oxide, hydroxide, carbonate, organic acid salt, inorganic acid salt of the polyvalent metal, ammonium complex of the polyvalent metal, secondary to quaternary amine complex of polyvalent metal, or carbonate or organic acid salt thereof. The organic acid salt may be an acetate, oxalate, citrate, lactate, phosphate, phosphite, hypophosphite, stearate, monoethylenic unsaturated carboxylic acid or the like. The inorganic acid salt may be chloride, sulfate, nitrate or the like.

In addition to the above, the polyvalent metal compound (b2) includes an alkyl alkoxide of a polyvalent metal.

These polyvalent metal compounds (b2) may be used singly or in combination of two or more.

In view of gas barrier properties and manufacturability of the gas barrier packaging material 1 according to the present embodiment, the polyvalent metal compound (b2) may be preferably a metal compound made of a bivalent metal.

More preferably, the polyvalent metal compound (b2) may be oxide, hydroxide, carbonate, organic acid salt (e.g., acetate) of an alkali earth metal, cobalt, nickel, copper and zinc; ammonium complex of cobalt, nickel, copper and zinc, or carbonate of these complexes.

Most preferably, the polyvalent metal compound (b2) may be oxide, hydroxide, carbonate of magnesium, calcium, copper and zinc; ammonium complex of copper or zinc; or carbonate of these complexes.

Further, a metal compound made of a monovalent metal, for example, a monovalent metal salt of the polycarboxylic acid polymer (b1) may be mixed with the polyvalent metal compound (b2) or may remain contained in the polyvalent metal compound (b2) to the extent that the gas barrier properties of the gas barrier packaging material 1 according to the present embodiment are not impaired. The form of the polyvalent metal compound (b2) is not specifically limited.

The content of the polyvalent metal compound (b2) is preferably 0.2 chemical equivalent or more to all the carboxyl groups of the polycarboxylic acid polymer (b1), more preferably 0.8 chemical equivalent or more and 10 chemical equivalent or less, and further more preferably 1 chemical equivalent or more and 5 chemical equivalent or less.

When the polyvalent metal compound (b2) of 0.2 chemical equivalent or more is added, barrier properties or moisture resistance of the barrier layer (B)4 can be improved.

When the polyvalent metal compound (b2) of 0.8 chemical equivalent or more is added, barrier properties of the barrier layer (B)4 can be easily expressed. Further, when the content of the polyvalent metal compound (b2) is 10 chemical equivalent or less, the coating liquid B is more likely to be stable as liquid. On the other hand, when the polyvalent metal compound (b2) of more than 10 chemical equivalent is added, the coating liquid B is less likely to be stable as liquid.

When the polyvalent metal compound (b2) of 1 chemical equivalent or more is added, barrier properties of the barrier layer (B)4 can be more easily expressed and less impaired under highly humid environment. Further, when the content of the polyvalent metal compound (b2) is 5 chemical equivalent or less, the coating liquid B becomes more stable as liquid.

The term "all the carboxyl groups" herein refers to including the carboxyl group of the polycarboxylic acid polymer (b1) which is not involved in the reaction and the carboxyl group which is a polyvalent metal salt of polycarboxylic acid generated by the reaction of the polycarboxylic acid polymer (b1) with the polyvalent metal compound (b2). Generation of polyvalent metal salt of polycarboxylic acid can be observed by measurement of an infrared absorption spectrum.

The chemical equivalent can be calculated, for example, by the following method.

In the following description, the chemical equivalent will be described by way of an example where the polycarboxylic acid polymer (b1) is polyacrylic acid and the polyvalent metal compound (b2) is magnesium oxide.

In a mass of 100 g of polyacrylic acid, the molecular weight of a monomer unit (acrylic acid) of polyacrylic acid is 72. Since one carboxyl group is present per molecule of monomer, the amount of carboxyl group in 100 g of polyacrylic acid is 1.39 mol. Here, one equivalent to 100 g of polyacrylic acid is the amount of base that neutralizes 1.39 mol. Accordingly, when 0.2 equivalent of magnesium oxide is added to 100 g of polyacrylic acid, the amount of magnesium oxide needed to neutralize 0.278 mol of carboxyl group may be added.

Since the valence of magnesium is two and the molecular weight of magnesium oxide is 40, the mass of 0.2 equivalent of magnesium oxide to 100 g of polyacrylic acid is 5.6 g (0.139 mol). When an infrared absorption spectrum of the gas barrier packaging material 1 according to the present embodiment is measured by a transmission method, the ratio ($\alpha/\beta$), which is a ratio of the maximum peak height ($\alpha$) of absorbance at 1560 $cm^{-1}$ to the maximum peak height ($\beta$) of absorbance at 1700 $cm^{-1}$, is preferably 1 or more.

Here, the ratio ($\alpha/\beta$) of the maximum peak height of absorbance of the infrared absorption spectrum will be described.

The maximum peak height ($\alpha$) is a maximum peak height of absorbance of the infrared absorption spectrum of C=O stretching vibration at 1560 $cm^{-1}$ assigned to a salt of carboxyl group (—COO—). That is, in general, the C=O stretching vibration assigned to a carboxylic acid salt (—COO—) appears as absorption spectrum in the infrared wavenumber region from 1500 $cm^{-1}$ to 1600 $cm^{-1}$ with an absorption peak having absorption maximum at around 1560 $cm^{-1}$.

Further, the maximum peak height ($\beta$) is a maximum peak height of absorbance of infrared absorption spectrum which is independent of the maximum peak height ($\alpha$), and is a maximum peak height of absorbance of infrared absorption spectrum of C=O stretching vibration at 1700 $cm^{-1}$ assigned to carboxyl group (—COOH). That is, in general, the C=O stretching vibration assigned to carboxylic group (—COOH) appears as absorption spectrum in the infrared wavenumber region from 1600 $cm^{-1}$ to 1800 $cm^{-1}$ with an absorption peak having absorption maximum at around 1700 $cm^{-1}$.

The absorbance of the gas barrier packaging material 1 according to the present embodiment is in proportion to the amount of chemical species having infrared activity present in the gas barrier packaging material 1. Accordingly, the ratio ($\alpha/\beta$) of the maximum peak height of the absorbance of infrared absorption spectrum can be used as a scale that represents the ratio of a salt of carboxyl group (—COO—) that produces a polyvalent metal compound and a salt to a free carboxyl group (—COOH) in the gas barrier packaging material 1.

Further, when a metal compound made of a monovalent metal is added to the gas barrier packaging material 1 according to the present embodiment to the extent that the gas barrier properties are not impaired, the C=O stretching vibration assigned to the monovalent metal of carboxylic acid (—COO—) appears as absorption spectrum in the infrared wavenumber region from 1500 $cm^{-1}$ to 1600 $cm^{-1}$ with an absorption peak having absorption maximum at around 1560 $cm^{-1}$. Accordingly, in this case, the absorption peak of the absorbance of infrared absorption spectrum contains two C=O stretching vibrations derived from the monovalent metal salt of carboxylic acid and the polyvalent metal salt of carboxylic acid. In this case as well, the ratio ($\alpha/\beta$) of the maximum peak height of the absorbance of infrared absorption spectrum can be used as a scale that represents the ratio of a carboxyl group polyvalent metal salt (—COO—) to a free carboxyl group (—COOH).

On the basis of the ratio ($\alpha/\beta$) of the maximum peak height of the absorbance of infrared absorption spectrum, the ionization degree defined in the following formula (1) can be calculated:

$$\text{Ionization degree} = Y/X \qquad (1)$$

(where X is a molar number of all the carbonyl carbons (assigned to a carboxyl group and a salt of carboxyl group) of the polycarboxylic acid polymer (b1) in 1 g of the gas barrier packaging material, and Y is a molar number of the carbonyl carbons assigned to a salt of carboxyl group contained in the polycarboxylic acid polymer (b1) in 1 g of the gas barrier packaging material).

The ionization degree is a percentage of the number of polyvalent metal salt of carboxyl group to the total number of free carboxyl group and polyvalent metal salt of carboxyl group in the polycarboxylic acid polymer (b1), and can be calculated as a more accurate ratio of chemical species compared with the ratio ($\alpha/\beta$) of the maximum peak height of the absorbance of infrared absorption spectrum.

As described later, the ionization degree of the gas barrier packaging material 1 according to the present embodiment can be calculated by measuring the ratio ($\alpha/\beta$) of the maximum peak height of the absorbance of infrared absorption spectrum of the gas barrier packaging material 1 according to the present embodiment.

Measurement of the infrared absorption spectrum can be performed, for example, by using FT-IR 2000 manufactured by PerkinElmer Inc. Specifically, the ratio ($\alpha/\beta$) of the maximum peak height of the absorbance of infrared absorption spectrum can be calculated by measuring the maximum peak height ($\alpha$) of absorbance at 1560 $cm^{-1}$ and the maximum peak height ($\beta$) of absorbance at 1700 $cm^{-1}$ by measuring the infrared absorption spectrum of a sample film (gas barrier packaging material 1) by a transmission method, ATR method (attenuated total reflection method), KBr pellet method, diffuse reflection method, photoacoustic method (PAS method) or the like.

The transmission method or ATR method is preferable for measurement of the infrared absorption spectrum in view of convenience.

In calculation of the ionization degree on the basis of the measurement result of the infrared absorption spectrum, the ionization degree of the gas barrier packaging material 1 can be calculated by using a calibration curve which is formed in advance.

The calibration curve is formed by the following procedure.

The polycarboxylic acid polymer (b1) is neutralized in advance by a known amount of sodium hydroxide, and coated, for example, on a plastic film substrate to prepare a standard sample in the form of a coating film. The C=O stretching vibration of carbonyl carbons attributed to a carboxyl group (—COOH) and a salt of carboxyl group (—COO$^-$Na$^+$) in the standard sample thus formed can be separated and detected by measuring the infrared absorption spectrum. Then, the ratio ($\alpha/\beta$) of the maximum peak height ($\alpha$) of absorbance at 1560 cm$^{-1}$ to the maximum peak height ($\beta$) of absorbance at 1700 cm$^{-1}$ is calculated. Since the polycarboxylic acid polymer (b1) is neutralized in advance by a known amount of sodium hydroxide, the molar ratio (the number ratio) of a carboxyl group (—COOH) to a salt of carboxyl group (—COO$^-$Na$^l$) in the polymer is known. Accordingly, several standard samples are first prepared by varying the amount of sodium hydroxide, and the infrared absorption spectrum is measured.

Then, a calibration curve can be formed by the regression analysis of the relationship between the ratio (a/(3) of the maximum peak height of absorbance and the known molar ratio.

By using the calibration curve, the molar ratio of a carboxyl group (—COOH) to a salt of carboxyl group (—COO—) in an unknown sample can be obtained from the measurement result of infrared absorption spectrum of the sample.

On the basis of the above result, the ratio (ionization degree) of the number of carbonyl carbons attributed to a salt of carboxyl group relative to the total number of carbonyl carbons of all the carboxyl groups (attributed to a carboxyl group and a salt of carboxyl group) of the polycarboxylic acid polymer (b1) can be obtained.

Moreover, the infrared absorption spectrum is derived from a chemical structure of carboxyl group and is hardly affected by metal species of salt. In a typical example of measurement conditions of the peak ratio of infrared absorption spectrum, the gas barrier packaging material 1 is formed of the support 2 and the gas barrier layer 5 disposed on the support 2, and when the support 2 is not light transmissive, the gas barrier layer 5 is separated from the support 2 to measure the infrared absorption spectrum of the gas barrier layer 5.

When the support 2 and the gas barrier layer 5 are integrally formed as a laminate and the support 2 does not absorb light near 1560 cm$^{-1}$ and light near 1700 cm$^{-1}$, the infrared absorption spectrum of the laminate is measured. On the other hand, when the support 2 absorbs light near 1560 cm$^{-1}$ and light near 1700 cm$^{-1}$, the gas barrier layer 5 is separated from the support 2 to measure the infrared absorption spectrum of the gas barrier layer 5.

When using the ATR method, measurement conditions can include use of KRS-5 (thallium bromide iodide), 45 degree of incident angle, 4 cm$^{-1}$ of resolution, and 30 times of integration.

For the infrared absorption spectrum measurement method by using FT-IR, see, e.g., "Fundamentals and Practice of FT-IR" written by Mitsuo Tasumi.

<Volatile Base (b3)>

Examples of the volatile base (b3) include ammonia, methylamine, ethylamine, dimethylamine, diethylamine, triethylamine, morpholine, ethanolamine and the like. In particular, ammonia is preferably used in view of coating liquid stability and gas barrier properties.

Since the polycarboxylic acid polymer (b1) may easily react with the polyvalent metal compound (b2) in aqueous solution and may form non-uniform precipitation, the volatile base (b3) is added to obtain a homogeneous mixture made of the polycarboxylic acid polymer (b1), the polyvalent metal compound (b2), and solvent water.

The content of the volatile base (b3) necessary to obtain dispersion liquid or solution of a homogeneous mixture is preferably 1 chemical equivalent or more, more preferably 1 chemical equivalent or more and 30 chemical equivalent or less to all the carboxyl groups of the polycarboxylic acid polymer (b1). When the polyvalent metal compound (b2) is oxide, hydroxide, carbonate of cobalt, nickel, copper or zinc, 1 chemical equivalent or more of the volatile base (b3) is added to allow a metal of the polyvalent metal compound (b2) along with the volatile base (b3) to form a complex so that transparent and homogeneous solution made of the polycarboxylic acid polymer (b1), the polyvalent metal compound (b2), the volatile base (b3) and water as a solvent is obtained.

The coating liquid B made of solution of a mixture of the polycarboxylic acid polymer (b1), the polyvalent metal compound (b2), the volatile base (b3) or the acid (b4), and water as a solvent can be prepared by sequentially dissolving the polycarboxylic acid polymer (b1), the polyvalent metal compound (b2) and one of the volatile base (b3) or the acid (b4) in water.

Further, the order of dissolving the polycarboxylic acid polymer (b1), the polyvalent metal compound (b2) and one of the volatile base (b3) or the acid (b4) in water is not specifically limited.

The content of the polycarboxylic acid polymer (b1) and the polyvalent metal compound (b2) (the total content of the polycarboxylic acid polymer (b1) and the polyvalent metal compound (b2)) in the coating liquid B is preferably in the range from 0.1 mass % to 50 mass % in view of coating suitability.

The barrier layer (B)4 is obtained by coating and drying a mixture of the polycarboxylic acid polymer (b1), the polyvalent metal compound (b2) and one of the volatile base (b3) and acid (b4) and water on the laminate.

By coating and drying the mixture on the laminate, the polyvalent metal compound (b2) is present in the layer made of the polycarboxylic acid polymer (b1), the polyvalent metal compound (b2), one of volatile base (b3) or the acid (b4) in the form of particle, molecule, metal salt of the polycarboxylic acid polymer (b1) and metal complex salt of polycarboxylic acid polymer (b1).

The metal complex described herein refers to a complex of at least one of cobalt, nickel, copper and zinc and the volatile base (b3). Specific examples of metal complex include a tetra ammonium complex of zinc or copper.

<Acid (b4)>

The acid (b4) may include an inorganic acid and an organic acid such as hydrochloric acid, acetic acid, sulfuric acid, oxalic acid, citric acid, malic acid and tartaric acid.

<Carbonic Acid Component-Containing Compound (b5)>

In dispersion liquid of a mixture of the polycarboxylic acid polymer (b1), the polyvalent metal compound (b2), one of the volatile base (b3) and the acid (b4) and solvent liquid, the carbonic acid component-containing compound (b5) may be contained.

The carbonic acid component-containing compound (b5) is added in order to make the polyvalent metal compound (b2) into the state of a carbonic acid polyvalent metal ammonium complex so as to prepare homogeneous solution in which 1 chemical equivalent or more of a polyvalent metal is contained to all the carboxyl groups of the polycarboxylic acid polymer (b1).

Examples of the carbonic acid component-containing compound (b5) typically include carbonate such as normal salt, acid salt (hydrogen carbonate), basic salt (hydroxide carbonate) or the like.

The carbonate may be, for example, carbonate of alkali metal or alkali earth metal, hydrogen carbonate of alkali metal or alkali earth metal, ammonium carbonate of alkali metal or alkali earth metal or the like. Specific examples of carbonate include ammonium carbonate, ammonium hydrogen carbonate, sodium hydrogen carbonate, sodium carbonate, potassium carbonate, potassium hydrogen carbonate, cesium carbonate, lanthanum carbonate, lithium carbonate, magnesium carbonate, manganese carbonate, nickel carbonate, strontium carbonate, amino guanidine carbonate and guanidine carbonate. Further, anhydrous salts, hydrated salts of these carbonates, or a mixture thereof may also be used. In particular, ammonium carbonate or ammonium hydrogen carbonate is preferable since it does not impair gas barrier properties and can be easily handled, and stabilizes the dispersion liquid of a mixture of the polycarboxylic acid polymer (b1), the polyvalent metal compound (b2), one of the volatile base (b3) and the acid (b4) and solvent liquid.

These carbonates may be used alone or in combination of two or more.

The adding amount of carbonic acid component-containing compound (b5) is preferably in the range from 0.05 to 10, more preferably in the range from 1 to 5, in a molar ratio to the polyvalent metal compound (b2) (molar number of the carbonic acid component-containing compound (b5)/molar number of the polyvalent metal compound (b2)).

When the molar ratio of the carbonic acid component-containing compound (b5) to the polyvalent metal compound (b2) is less than 0.05, it is difficult to obtain a homogeneous solution (coating liquid B) which contains the polyvalent metal salt of the amount more than 1 chemical equivalent to all the carboxyl groups of the polycarboxylic acid polymer (b1). On the other hand, when the molar ratio of the carbonic acid component-containing compound (b5) to the polyvalent metal compound (b2) is more than 10, it is difficult to form the barrier layer (B)4.

When the adding amount of carbonic acid component-containing compound (b5) is in the range from 1 to 5 in a molar ratio to the polyvalent metal compound (b2) (molar number of the carbonic acid component-containing compound (b5)/molar number of the polyvalent metal compound (b2)), the coating liquid B is stable as liquid. The carbonic acid component-containing compound (b5) is appropriately used for forming the barrier layer (B)4, thereby providing good barrier properties.

In addition to the polycarboxylic acid polymer (b1), the polyvalent metal compound (b2), one of the volatile base (b3) and the acid (b4), the carbonic acid component-containing compound (b5) and solvent, other polymers, solvent other than water, monovalent metal compound, inorganic layered compound such as montmorillonite, various additives may be added as appropriate to the coating liquid B which constitutes the barrier layer (B)4 to the extent that does not impair gas barrier properties.

The additives include plasticizer, resin, dispersant, surface activating agent, softener, stabilizer, anti-blocking agent, film-forming agent, adhesive and oxygen absorbent.

The plasticizer may be selected as appropriate, for example, from known plasticizers. Specific examples of the plasticizer include ethylene glycol, trimethylene glycol, propylene glycol, tetramthylene glycol, 1,3-butanediol, 2,3-butanediol, pentamethylene glycol, hexamethylene glycol, diethylene glycol, triethylene glycol, polyethylene glycol, polyvinyl alcohol, ethylene-vinyl alcohol copolymer, polyethylene oxide, sorbitol, mannitol, dulcitol, erythritol, glycerin, lactic acid, fatty acid, starch and phthalic ester. These plasticizers may be used alone or in combination of two or more as necessary.

Of these plasticizers, polyethylene glycol, polyvinyl alcohol, ethylene-vinyl alcohol copolymer, glycerin and starch are preferable in view of stretchability and gas barrier properties.

As for the adding amount of the additive, the ratio of the mass of polycarboxylic acid polymer (b1) to the mass of the additive (polycarboxylic acid polymer (b1):additive) is preferably in the range from 70:30 to 99.9:0.1, more preferably in the range from 80:20 to 98:2.

When the ratio of the mass of polycarboxylic acid polymer (b1) to the mass of the additive is within the above range, the additive has good effect.

On the other hand, when the additive percentage is more than 30% in the ratio of the mass of polycarboxylic acid polymer (b1) to the mass of the additive, the additive negatively affects the expression of barrier properties or the stability of coating liquid.

Further, when the additive percentage is less than 0.1% in the ratio of the mass of polycarboxylic acid polymer (b1) to the mass of the additive, the additive does not perform the effect.

<Coating Liquid B of Barrier Layer (B)4>

The barrier layer (B)4 is formed of the coating liquid B.

The coating liquid B is solution of a mixture which contains the polycarboxylic acid polymer (b1), the polyvalent metal compound (b2), one of the volatile base (b3) and acid (b4), and a solvent.

The solvent used for the coating liquid B includes, but is not particularly limited, water, mixed solvent of water and organic solvent, or the like. Of these solvents, water is most preferable in view of solubility of the polycarboxylic acid polymer (b1).

Water is preferably purified water, and may be, for example, distilled water, ion-exchanged water, or the like.

The organic solvent may be at least one organic solvent selected from a group consisting of lower alcohols having 1 to 5 carbon atoms and lower ketones having 3 to 5 carbon atoms.

Examples of organic solvents include methanol, ethanol, propanol, 2-propanol, isopropanol, n-butanol, isobutanol, sec-butanol, tert-butanol, acetone, methyl ethyl ketone, and the like.

Further, the mixed solvent of water and organic solvent is preferably a mixed solvent using the above water and organic solvent, and more preferably a mixed solvent of water and a lower alcohol having 1 to 5 carbon atoms.

In general, the mixed solvent contains 20 to 95 mass % of water and 80 to 5 mass % of organic solvent (where the sum of water and organic solvent is 100 mass %).

The barrier layer (B)4 may be laminated so that the layer that contains the polyvalent metal compound (b2) is adjacent to the layer that contains the polycarboxylic acid polymer (b1). For example, polyvalent metal salt dispersion liquid which is made of a polyvalent metal salt and a disperse agent is coated and dried on the layer that contains the polycarboxylic acid polymer (b1) to laminate the layer of the polyvalent metal salt on the layer that contains the polycarboxylic acid polymer (b1). As a result, crosslinking reaction occurs between the carboxyl group of the layer that contains the polycarboxylic acid polymer (b1) and the polyvalent metal salt at an interface between the layer that contains the polycarboxylic acid polymer (b1) and the layer of the polyvalent metal salt, and thus the barrier layer (B)4 has the ratio (α/β), which is a ratio of the maximum peak height (α) of absorbance in the range from 1490 cm$^{-1}$ to 1659 cm$^{-1}$ to the maximum peak height (β) of absorbance in the range from 1660 cm$^{-1}$ to 1750 cm$^{-1}$, of 1 or more.

Moreover, part of the carboxyl groups of the polycarboxylic acid polymer (b1) may be neutralized by a basic compound in advance.

Preferably, the basic compound is at least one selected from a group consisting of a polyvalent metal compound, a monovalent metal compound and ammonia.

By neutralizing part of the carboxyl groups of the polycarboxylic acid polymer in advance, water resistance of the barrier layer (B)4 can be improved.

The neutralization degree of the carboxyl group is preferably 30 mol % or less, more preferably 25 mol % or less, in view of stability of the coating liquid B that constitutes the barrier layer (B)4.

When the neutralization degree of the carboxyl group is more than 30%, the coating liquid B is not stabilized since precipitation occurs in the coating liquid B. On the other hand, when the neutralization degree of the carboxyl group is 30% or less, the coating liquid B can be stabilized. Moreover, when the neutralization degree of the carboxyl group is 25% or less, the coating liquid B can be stabilized on a constant basis.

In order to improve coatability, the polyvalent metal salt dispersion liquid may contain a binder resin or the like in addition to the polyvalent metal salt and the dispersion liquid.

The barrier layer (B)4 may also be formed by spraying solution which contains the polyvalent metal salt onto the layer which contains the polycarboxylic acid polymer (b1), or by immersing the layer which contains the polycarboxylic acid polymer (b1) into solution which contains the polyvalent metal salt. For example, after the layer which contains the polycarboxylic acid polymer (b1) is formed, the layer which contains the polycarboxylic acid polymer (b1) is immersed in solution which contains the polyvalent metal salt, cleansed and dried. As a result, crosslinking reaction occurs between the carboxyl group of the layer which contains the polycarboxylic acid polymer (b1) and the polyvalent metal salt on a surface of the layer which contains the polycarboxylic acid polymer (b1), and thus the barrier layer (B)4 has the ratio (α/β), which is a ratio of the maximum peak height (α) of absorbance in the range from 1490 cm$^{-1}$ to 1659 cm$^{-1}$ to the maximum peak height (β) of absorbance in the range from 1660 cm$^{-1}$ to 1750 cm$^{-1}$, of 1 or more.

Moreover, part of the carboxyl groups of the polycarboxylic acid polymer (b1) may be neutralized by a basic compound in advance.

Preferably, the basic compound is at least one selected from a group consisting of a polyvalent metal compound, a monovalent metal compound and ammonia.

By neutralizing part of the carboxyl groups of the polycarboxylic acid polymer in advance, water resistance of the barrier layer (B)4 can be improved.

The neutralization degree of the carboxyl group is preferably 30 mol % or less, more preferably 25 mol % or less, in view of stability of the coating liquid B that constitutes the barrier layer (B)4.

The solution which contains the polyvalent metal salt is preferably solution which uses a water soluble metal salt such as acetate, lactate, chloride or sulfate, which is highly soluble in aqueous solution and present as an ion in aqueous solution. Further, in addition to the aqueous solution, dispersion liquid of a metal compound may also be used.

<Coating>

The method for coating the coating liquid A of the adhesive layer (A)3 and the coating liquid B of the barrier layer (B)4 includes, but is not specifically limited to, casting, dipping, roll coating, gravure coating, screen printing, reverse coating, spray coating, kit coating, die coating, metaling bar coating, chamber doctor combined coating and curtain coating.

Coating and drying of the coating liquid A of the adhesive layer (A)3 and the coating liquid B of the barrier layer (B)4 are successively performed. After each coating liquid is dried, a winding up process or an aging process may also be performed.

<Drying>

After coating, the coating liquid A of the adhesive layer (A)3 and the coating liquid B of the barrier layer (B)4 are each dried to remove the solvent, thereby forming the adhesive layer (A)3 and barrier layer (B)4, respectively.

The drying method includes, but is not specifically limited to, hot air drying, hot roll contact drying, infrared heating and microwave heating.

These drying methods can be used alone or in combination.

Typically, the drying temperature is preferably in the range from 40 to 160° C. when water or a mixed solvent of water and organic solvent is used as a solvent, but is not specifically limited thereto.

Although pressure in a drying process is preferably applied under a normal pressure or a reduced pressure, a normal pressure is preferable in view of simplicity of facility.

<Degree of Oxygen Permeability>

The gas barrier packaging material 1 of the present embodiment typically has an oxygen permeability of 300 cm$^3$ (STP)/m$^2$·day·MPa or less, preferably 200 cm$^3$ (STP)/m$^2$·day·MPa or less, more preferably 100 cm$^3$ (STP)/m$^2$·day·MPa or less, and particularly preferably 50 cm$^3$ (STP)/m$^2$·day·MPa or less at a temperature of 30° C. and a relative humidity of 70%.

<Application (Lamination)>

The gas barrier packaging material 1 according to the present embodiment may be laminated with other substrates for the purpose of providing strength, sealing properties, easiness of seal opening, designability, light shielding property or the like. Further, after other substrates are laminated on the gas barrier packaging material 1 according to the present embodiment, at least one treatment selected from a group consisting of retort treatment, boil treatment and humidity conditioning treatment may be applied.

Other substrates are appropriately selected according to the purposes, but typically plastic films or papers are advantageously used. Further, such plastic films or papers may be used singly, or two or more of plastic films or papers may be laminated, or alternatively, plastic films and papers may be used as lamination.

The substrate may be in the form of film, sheet, bottle, cup, tray, tank, tube or the like, but is not specifically limited thereto. Considering laminating the gas barrier packaging material 1, the substrate is preferably in the form of a film or a sheet. Further, the form of a sheet before forming into a cup or the form of a flattened tube is also preferable.

The method of laminating the gas barrier packaging material 1 according to the present embodiment and other substrates includes a method of laminating by using an adhesive via a lamination technique. Specific examples of lamination techniques include dry lamination, wet lamination, extrusion lamination, and the like.

The gas barrier packaging material 1 according to the present embodiment may be laminated on other substrates in the following manner considering the handling ability as a product, although not specifically limited thereto: (a) gas barrier packaging material/polyolefin, (b) gas barrier packaging material/polyolefin (tube-shape)/gas barrier packaging material, (c) gas barrier packaging material/Nylon/polyolefin, (d) gas barrier packaging material/polyolefin/paper/polyolefin, (e) polyolefin/gas barrier packaging material/polyolefin, (f) polyolefin/gas barrier packaging material/Nylon/polyolefin, (g) polyethylene terephthalate/gas barrier packaging material/Nylon/polyolefin, or the like.

Further, these laminates may also be repeatedly laminated.

Considering providing designability, light shielding properties, moisture protection properties or the like, the laminates may be laminated with a printed layer or a deposited layer of metal or a silicon compound.

Preferably, a laminated surface of the gas barrier packaging material 1 is not disposed on the outermost layer in view of gas barrier properties. When a laminated surface of the gas barrier packaging material 1 is disposed on the outermost layer, the barrier layer or the like may be scratched, which may cause decrease in gas barrier properties.

The present embodiment can provide the gas barrier packaging material 1 which can be manufactured by using only a general coating apparatus without applying a high temperature and high pressure treatment such as a retort treatment, exhibits stable gas barrier properties for an extended period of time, and has a high lamination strength when formed as a laminate film.

Further, the gas barrier packaging material 1 according to the present embodiment is advantageously used for gas barrier packaging materials for food products, beverages, drugs, pharmaceutical products, and precision metal parts such as electronics, which are often deteriorated by exposure to oxygen or the like.

EXAMPLES

The present invention will be further described in detail by means of examples and comparative examples. However, the present invention is not limited to those examples.

Preparation Example 1

The coating liquid A1 was prepared by the following procedure.

Polyvinyl alcohol, aqueous polyurethane, curing agent, 2-propanol and water were formulated at a mass and a solid content concentration shown in Table 1 to thereby obtain the coating liquid A1.

As the polyvinyl alcohol, POVAL PVA117 (degree of saponification: 98% to 99%, degree of polymerization: 1700), manufactured by Kuraray Co. Ltd. was used.

As the aqueous polyurethane, polyurethane dispersion, Takelac WPB341, manufactured by Mitsui Chemicals, Inc. was used.

As the curing agent, Takenate A56 (diisocyanate), manufactured by Mitsui Chemicals Polyurethanes Inc. was used.

As the 2-propanol, 2-propanol manufactured by Tokyo Chemical Industry Co., Ltd. was used.

TABLE 1

|  | Mass (g) (Solid content concentration) |
| --- | --- |
| Polyvinyl alcohol | 6 (100 mass %) |
| Aqueous polyurethane | 5 (30 mass %) |
| Curing agent | 1 (100 mass %) |
| 2-propanol | 27.48 (—) |
| Water | 243.85 (—) |
| Total | 283.33 (3 mass %) |

Preparation Example 2

The coating liquid A2 was prepared in the same manner as Preparation Example 1 except that polyvinyl alcohol, aqueous polyurethane, curing agent, 2-propanol and water were formulated at a mass and a solid content concentration shown in Table 2.

TABLE 2

|  | Mass (g) (Solid content concentration) |
| --- | --- |
| Polyvinyl alcohol | 3 (100 mass %) |
| Aqueous polyurethane | 10 (30 mass %) |
| Curing agent | 0.6 (100 mass %) |
| 2-propanol | 21.34 (—) |
| Water | 185.06 (—) |
| Total | 220.00 (3 mass %) |

Preparation Example 3

The coating liquid B1 was prepared by the following procedure.

Polycarboxylic acid, zinc oxide, ammonium water, ammonium carbonate, 2-propanol and water were formulated at a mass and a solid content concentration shown in Table 3 to thereby obtain the coating liquid B1.

As the polycarboxylic acid, Aron A10-H (polyacrylic acid), manufactured by Toagosei Co., Ltd. was used.

As the zinc oxide, zinc oxide manufactured by Tokyo Chemical Industry Co., Ltd. was used.

As the ammonium water, ammonium water (28%, Wako 1st grade) manufactured by Wako Pure Chemical Industries, Ltd. was used.

As the ammonium carbonate, ammonium carbonate (reagent special grade) manufactured by Wako Pure Chemical Industries, Ltd. was used.

As the 2-propanol, 2-propanol manufactured by Tokyo Chemical Industry Co., Ltd. was used.

TABLE 3

| | Mass (g) (Solid content concentration) |
|---|---|
| Polycarboxylic acid | 30 (25 mass %) |
| Zinc oxide | 4.2 (100 mass %) |
| Ammonium water | 8.5 (28 mass %) |
| Ammonium carbonate | 9.0 (100 mass %) |
| 2-propanol | 11.7 (—) |
| Water | 171.3 (—) |
| Total | 234.7 (5 mass %) |

Preparation Example 4

The coating liquid B2 was prepared by the following procedure.

Polyacrylic acid ammonium salt, magnesium oxide, 2-propanol and water were formulated at a mass and a solid content concentration shown in Table 4 to thereby obtain the coating liquid B2.

As the polyacrylic acid ammonium salt, Aron A-30 manufactured by Toagosei Co., Ltd. was used.

As the magnesium oxide, SMO manufactured by Sakai Chemical Industry Co, Ltd. was used.

As the 2-propanol, 2-propanol manufactured by Tokyo Chemical Industry Co., Ltd. was used.

A mixture of polyacrylic acid ammonium salt, magnesium oxide and 2-propanol was stirred by a technique using a bead mill by the following procedure.

Polyacrylic acid ammonium salt was dissolved in water, and then 2-propanol was added thereto and stirred. Then, magnesium oxide was added to the liquid mixture of polyacrylic acid ammonium salt aqueous solution and 2-propanol and stirred.

The resultant liquid was dispersed for 2 hours in a planetary ball mill (P-7, manufactured by Fritsch GmbH) by using zirconia beads of 0.3 mmφ, and then the beads were separated therefrom.

TABLE 4

| | Mass (g) (Solid content concentration) |
|---|---|
| Polyacrylic acid ammonium salt | 40 (30 mass %) |
| Magnesium oxide | 2.4 (100 mass %) |
| 2-propanol | 38.4 (—) |
| Water | 125.5 (—) |
| Total | 206.3 (5 mass %) |

Preparation Example 5

The coating liquid B3 was prepared by the following procedure.

Polycarboxylic acid, zinc oxide, Si agent, distilled water and 2-propanol were formulated at a mass and a solid content concentration shown in Table 5 to thereby obtain the coating liquid B3.

As the polycarboxylic acid, Aron A10-H (polyacrylic acid), manufactured by Toagosei Co., Ltd. was used.

As the zinc oxide, zinc oxide manufactured by Tokyo Chemical Industry Co., Ltd. was used.

As the Si agent, KBE9007 (3-isocyanate propyl triethoxysilane) manufactured by Shin-Etsu Chemical Co., Ltd. was used.

As the 2-propanol, 2-propanol manufactured by Tokyo Chemical Industry Co., Ltd. was used.

TABLE 5

| | Mass (g) (Solid content concentration) |
|---|---|
| Polycarboxylic acid | 20 (25 mass %) |
| Zinc oxide | 0.6 (100 mass %) |
| Si agent | 0.1 (100 mass %) |
| distilled water | 56.0 (—) |
| 2-propanol | 37.3 (—) |
| Total | 114 (5 mass %) |

Preparation Example 6

The coating liquid B4 was prepared by the following procedure.

Zinc oxide dispersion liquid, resin, curing agent and ethyl acetate were formulated at a mass and a solid content concentration shown in Table 6 to thereby obtain the coating liquid B4.

As the zinc oxide dispersion liquid, ZS303EA (zinc oxide dispersion liquid) manufactured by Sumitomo Osaka Cement Co., Ltd. was used.

As the resin, Takelac A525 (polyurethane) manufactured by Mitsui Chemicals Polyurethanes Inc. was used.

As the curing agent, Takenate A52 (diisocyanate), manufactured by Mitsui Chemicals Polyurethanes Inc. was used.

As the ethyl acetate, ethyl acetate manufactured by Tokyo Chemical Industry Co., Ltd. was used.

TABLE 6

| | Mass (g) (Solid content concentration) |
|---|---|
| Zinc oxide dispersion liquid | 50 (32.3 mass %) |
| Resin | 3.7 (50 mass %) |
| Curing agent | 0.9 (75 mass %) |
| Ethyl acetate | 133 (—) |
| Total | 187.6 (10 mass %) |

Example 1

As the substrate, the biaxially oriented polypropylene film U-1 (thickness 20 μm) manufactured by Mitsui Chemicals Tohcello Inc. was used.

The coating liquid A1 was coated on one surface of the substrate by a bar coater wet 6 μm and dried in an oven at 80° C. to form an adhesive layer (coating liquid A1 layer) with a thickness of 0.2 μm.

Then, the coating liquid B1 was applied on the adhesive layer formed on one surface of the substrate by a bar coater wet 12 μm and dried in an oven at 80° C. to form a barrier layer (coating liquid B1 layer) with a thickness of 0.6 μm. Thus, the gas barrier packaging material of Example 1 made of the substrate/adhesive layer/barrier layer laminated in this order was obtained.

The gas barrier packaging material thus obtained was bonded to the polypropylene film via an adhesive by using a multicoater TM-MC manufactured by Hirano Tecseed Co., Ltd. Thus, the laminate film of Example 1 made of the gas barrier packaging material/adhesive/polypropylene film laminated in this order was obtained. Here, the laminated surface of the gas barrier packaging material was disposed to be in contact with the adhesive.

The laminate film was aged at 40° C. for 3 days after bonding.

The adhesive used was two-liquid curing type adhesive manufactured by Mitsui Chemicals polyurethanes Inc., Takelac A620 (base resin)/Takenate A65 (curing agent).

The polypropylene film used was the polypropylene film manufactured by Toray Advanced Film Co., Ltd., Torayfan ZK93KM (thickness 60 μm).

Example 2

The gas barrier packaging material of Example 2 was obtained in the same manner as Example 1 except that the coating liquid A3 was used instead of the coating liquid A1. The coating liquid A3 was prepared by replacing the aqueous polyurethane of the coating liquid A1 with the water-dispersed polyurethane, SUPERFLEX 500M, manufactured by DKS Co. Ltd.

Further, the laminate film was fabricated by using the gas barrier packaging material of Example 2 in the same manner as Example 1.

Example 3

The gas barrier packaging material of Example 3, which was made of the substrate/adhesive layer/barrier layer laminated in this order, was obtained in the same manner as Example 1 except that the coating liquid A4 was used instead of the coating liquid A1. The coating liquid A4 was prepared by replacing the aqueous polyurethane of the coating liquid A1 with DENKA POVAL B-24 (degree of saponification: 86% to 89%, degree of polymerization: 2400), manufactured by Denka Co. Ltd.

Further, the laminate film was fabricated by using the gas barrier packaging material of Example 3 in the same manner as Example 1.

Example 4

The gas barrier packaging material of Example 4, which was made of the substrate/adhesive layer/barrier layer laminated in this order, was obtained in the same manner as Example 1 except that the coating liquid A2 was used instead of the coating liquid A1.

Further, the laminate film was fabricated by using the gas barrier packaging material of Example 4 in the same manner as Example 1.

Example 5

The gas barrier packaging material of Example 5, which was made of the substrate/adhesive layer/barrier layer laminated in this order, was obtained in the same manner as Example 1 except that the barrier layer (coating liquid B2 layer) with a thickness of 0.6 μm was formed by using the coating liquid B2.

Further, the laminate film was fabricated by using the gas barrier packaging material of Example 5 in the same manner as Example 1.

Example 6

The gas barrier packaging material of Example 6, which was made of the substrate/adhesive layer/barrier layer/barrier layer laminated in this order, was obtained in the same manner as Example 1 except that the barrier layer (coating liquid B3 layer) with a thickness of 0.3 μm was formed by coating the coating liquid B3 on the adhesive layer formed on one surface of the substrate by using a bar coater and drying the coated coating liquid B3, and the barrier layer (coating liquid B4 layer) with a thickness of 0.3 μm was formed by coating the coating liquid B4 on the above barrier layer by using a bar coater.

Further, the laminate film was fabricated by using the gas barrier packaging material of Example 6 in the same manner as Example 1.

Example 7

The adhesive layer was formed on one surface of the substrate in the same manner as Example 1.

Then, the coating liquid B3 was coated on the adhesive layer formed on one surface of the substrate by using a bar coater and dried to form a barrier layer (coating liquid B3 layer) with a thickness of 0.3 μm. Thus, the laminate made of the substrate/adhesive layer/barrier layer laminated in this order was obtained.

Then, the laminate was cleansed by being immersed in zinc acetate aqueous solution with a concentration of 10% at a temperature of 23° C. for 20 seconds, and then in distilled water at a temperature of 23° C. for 10 seconds.

Then, the laminate was placed still in an oven set at a temperature of 90° C. for 1 minute, and dried to thereby obtain the gas barrier packaging material of Example 7, made of the substrate/adhesive layer/barrier layer/barrier layer laminated in this order.

Further, the laminate film was fabricated by using the gas barrier packaging material of Example 7 in the same manner as Example 1.

Example 8

The gas barrier packaging material of Example 8, which was made of the substrate/adhesive layer/barrier layer laminated in this order, was obtained in the same manner as Example 1 except that the biaxially oriented polyethylene terephthalate film, Lumirror P60 (thickness 12 μm), manufactured by Toray was used as the substrate.

Further, the laminate film was fabricated by using the gas barrier packaging material of Example 8 in the same manner as Example 1.

Comparative Example 1

The coating liquid A5 was prepared in the same manner as Preparation Example 1 except that the polyvinyl alcohol was not used.

The gas barrier packaging material of Comparative Example 1, which was made of the substrate/adhesive layer/barrier layer laminated in this order, was obtained in the same manner as Example 1 except that the coating liquid A5 was used instead of the coating liquid A1.

Further, the laminate film was fabricated by using the gas barrier packaging material of Comparative Example 1 in the same manner as Example 1.

Comparative Example 2

The coating liquid A6 was prepared in the same manner as Preparation Example 1 except that the aqueous polyurethane was not used.

The gas barrier packaging material of Comparative Example 2, which was made of the substrate/adhesive layer/barrier layer laminated in this order, was obtained in the same manner as Example 1 except that the coating liquid A6 was used instead of the coating liquid A1.

Further, the laminate film was fabricated by using the gas barrier packaging material of Comparative Example 2 in the same manner as Example 1.

Comparative Example 3

The gas barrier packaging material of Comparative Example 3, which was made of the substrate/adhesive layer/barrier layer laminated in this order, was obtained in the same manner as Example 1 except that the barrier layer (coating liquid B3 layer) with a thickness of 0.3 μm was formed by using the coating liquid B3.

Further, the laminate film was fabricated by using the gas barrier packaging material of Comparative Example 3 in the same manner as Example 1.

Comparative Example 4

Then, the coating liquid B1 was coated on one surface of the substrate by using a bar coater and dried to form a barrier layer (coating liquid B1 layer) with a thickness of 0.6 μm. Thus, the gas barrier packaging material of Comparative Example 4 made of the substrate/adhesive layer laminated in this order was obtained.

Further, the laminate film was fabricated by using the gas barrier packaging material of Comparative Example 4 in the same manner as Example 1.

Comparative Example 5

The coating liquid B5 was prepared in the same manner as Preparation Example 2 except that the zinc oxide was not used.

The gas barrier packaging material of Comparative Example 5, which was made of the substrate/adhesive layer/barrier layer laminated in this order, was obtained in the same manner as Example 1 except that the coating liquid B5 was used instead of the coating liquid B1.

Further, the laminate film was fabricated by using the gas barrier packaging material of Comparative Example 5 in the same manner as Example 1.

[Evaluation]

(1) Measurement of Oxygen Permeability

The oxygen permeability of the gas barrier packaging materials of Examples 1 to 8 and Comparative examples 1 to 5 was measured.

The oxygen permeability of the gas barrier packaging material was measured by using an oxygen transmission rate tester, OXTRAN™2/20, manufactured by Mocon Control Inc, under the conditions at a temperature of 30° C. and a relative humidity of 70%.

The measurement method was in compliance with ASTM F1927-98 (2004), and the measurements were indicated in a unit of $cm^3$ (STP)/($m^2$-day-MPa). The (STP) herein refers to a standard condition (0° C., 1 atm) that defines a volume of oxygen.

The evaluation results are shown in Table 8.

(2) Measurement of Lamination Strength

The laminate films of Examples 1 to 8 and Comparative Examples 1 to 5 were cut into 15 mm wide rectangular pieces. Then, the polypropylene film and the gas barrier packaging material were peeled off from each other at a peeling angle of 90 degrees by using a tensile tester Tensilon for measurement of lamination strength at a rate of 300 mm/min.

The results are shown in Table 8.

(3) Coatability of Coating Liquid

For the coating liquid A1 to the coating liquid A6 and the coating liquid B1 to the coating liquid B5, the coatability in coating on the substrate or the adhesive layer was visually observed.

The coatability was evaluated on three scales, which represent A: repelling or irregularity was not present, B: repelling or irregularity was partially present, and C: repelling or irregularity was entirely present, failing to form a film.

Table 7 shows the evaluation results for coatability of the coating liquid A1 to the coating liquid A6, and Table 8 shows the evaluation results for coatability of the coating liquid B1 to the coating liquid B5.

TABLE 7

|  | Coatability |
|---|---|
| Coating liquid A1 | A |
| Coating liquid A2 | A |
| Coating liquid A3 | A |
| Coating liquid A4 | A |
| Coating liquid A5 | A |
| Coating liquid A6 | A |

TABLE 8

|  | The oxygen permeability 30° C., 70% RH ($cm^3$ (STP)/($m^2$-day-MPa)) | Lamination strength (N/15 mm) | Coatability |
|---|---|---|---|
| Example 1 | 5 | 1.5 | A |
| Example 2 | 5 | 1.5 | A |
| Example 3 | 5 | 1.5 | A |
| Example 4 | 5 | 1.5 | A |
| Example 5 | 10 | 1.5 | A |
| Example 6 | 50 | 1.5 | A |
| Example 7 | 40 | 1.5 | A |
| Example 8 | 5 | 2.5 | A |
| Comparative | 5 | 0.1 | A |

TABLE 8-continued

| | The oxygen permeability 30° C., 70% RH (cm$^3$ (STP)/(m$^2$-day-MPa)) | Lamination strength (N/15 mm) | Coatability |
|---|---|---|---|
| Example 1 Comparative Example 2 | Unmeasurable | Unmeasurable | C |
| Comparative Example 3 | 1000 | 1.5 | A |
| Comparative Example 4 | Unmeasurable | Unmeasurable | C |
| Comparative Example 5 | 1000 | 1.5 | A |

From the results shown in Table 8, it was found that the gas barrier packaging materials of Examples 1 to 8 had extremely low oxygen permeability and high gas barrier properties compared with the gas barrier packaging materials of Comparative Examples 1 to 5.

Further, it was found that the laminate films of Examples 1 to 8 had a lamination strength which was the same or higher than that of the gas barrier packaging materials of Comparative Examples 1 to 5.

Further, it was found that the coatability of coating liquid was high in Examples 1 to 8 and that the gas barrier packaging material could be manufactured by using only a general coating apparatus.

INDUSTRIAL APPLICABILITY

The gas barrier packaging material of the present invention is good in productivity since it can be manufactured by using only a general coating apparatus without applying a high temperature and high pressure treatment such as a retort treatment.

Further, the gas barrier packaging material of the present invention has extremely low oxygen permeability with high gas barrier properties, and provides a laminate film having high lamination strength.

REFERENCE SIGNS LIST

1 Gas barrier packaging material
2 Support
3 Adhesive layer (A)
4 Barrier layer (B)
5 Gas barrier layer

What is claimed is:

1. A gas barrier packaging material comprising:
   a support; and
   a gas barrier layer made of an adhesive layer (A) which is disposed on one surface of the support and contains an aqueous polyurethane resin (a1), a water soluble polymer (a2) that is at least one of a polyvinyl alcohol polymer and its derivatives and a curing agent (a3) with a formulation ratio of the aqueous polyurethane resin (a1) and the water soluble polymer (a2) in the range from 10:90 to 60:40 in mass ratio, and a barrier layer (B) which is formed on the adhesive layer (A),
   wherein the barrier layer (B) contains at least a polyvalent metal salt of a polycarboxylic acid polymer (b1), and, when an infrared absorption spectrum of the barrier layer (B) is measured by a transmission method, a ratio (α/β), which is a ratio of a maximum peak height (α) of an absorbance in the range from 1490 cm$^{-1}$ to 1659 cm$^{-1}$ to a maximum peak height (β) of an absorbance in the range from 1660 cm$^{-1}$ to 1750 cm$^{-1}$, is 1 or more.

2. The gas barrier packaging material of claim 1, wherein the support contains polyolefin.

* * * * *